(12) United States Patent
Murano (10) Patent No.: US 7,509,015 B2
(45) Date of Patent: Mar. 24, 2009

(54) SECURE FIBER OPTIC NETWORK CASSETTE ASSEMBLY

(75) Inventor: Adam Murano, West Chesterfield, NH (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 11/493,774

(22) Filed: Jul. 26, 2006

(65) Prior Publication Data
US 2008/0025683 A1    Jan. 31, 2008

(51) Int. Cl.
*G02B 6/00* (2006.01)
(52) U.S. Cl. .......................... 385/135; 135/134
(58) Field of Classification Search .................. 385/135
See application file for complete search history.

(56) References Cited

U.S. PATENT DOCUMENTS

| 4,900,123 | A | * | 2/1990 | Barlow et al. | 385/53 |
|---|---|---|---|---|---|
| 5,915,802 | A | * | 6/1999 | Siler | 312/216 |
| 6,282,360 | B1 | * | 8/2001 | Milanowski et al. | 385/135 |
| 6,356,697 | B1 | * | 3/2002 | Braga et al. | 385/135 |
| 6,758,600 | B2 | | 7/2004 | Del Grosso et al. | |
| 6,869,227 | B2 | | 3/2005 | Del Grosso et al. | |
| 6,925,241 | B2 | * | 8/2005 | Bohle et al. | 385/135 |
| 7,205,481 | B2 | * | 4/2007 | Higbie | 174/156 |
| 7,333,706 | B2 | * | 2/2008 | Parikh et al. | 385/135 |
| 2003/0223723 | A1 | * | 12/2003 | Massey et al. | 385/135 |

* cited by examiner

*Primary Examiner*—Uyen Chau N Le
*Assistant Examiner*—Kajli Prince
(74) *Attorney, Agent, or Firm*—McCarter & English, LLP (57) ABSTRACT

Assemblies and methods for securing a fiber optic network cassette assembly are provided. A typical secure cassette assembly includes a cabinet adapted to be locked on both a front and rear side of the cabinet. Internally, a plurality of cassettes are placed on a cassette tray adapted to slide back and forth within the cabinet. Insert pins are placed into holes on the cassettes locking into the cassette tray. A limiter is placed inside the cabinet that prevents the cassette tray from sliding when engaged. If one of the cassettes is forcibly removed, the insert pin will shear the fiber internal to the cassette and destroy the cassette, thereby disabling the network and typically alerting a network administrator or designated individual.

14 Claims, 7 Drawing Sheets

Tray at Position A

SECURE FIBER OPTIC NETWORK CASSETTE ASSEMBLY

BACKGROUND

1. Technical Field

The present disclosure relates to assemblies and methods for securing a fiber optic network cassette assembly.

2. Background Art

Many transactions take place everyday over the Internet, increasing a need for secure Ethernet communications. Typically, network security is handled in an Ethernet's layers 2-7, providing packet encryption and decryption algorithms up to 256 bit, which is generally considered virtually unbreakable by mathematicians and programmers alike. Although these security techniques have generally been successful in preventing a non-physical security breach, they do not prevent physical tampering or access to secure data channels. For example, encryption and decryption algorithms do not prevent a person internal to an organization from gaining physical access to secure data channels from which said person is restricted. A person having a low level security clearance can sit at another person's workstation who has a higher level of security clearance and thereby access data or information restricted from said individual.

To combat security breach, companies and military bases alike promote isolated networks in the premise environment starting at the data center or main computer room. The use of keying connectors at the user workspace or computer terminal is rapidly becoming the preferred method used to prevent personal connectivity or access to a secure network.

In a keyed connector scenario, an environment, such as a secure finance center at an insurance company or the Pentagon, is universally equipped with keyed fiber optic adapters at each user workstation. It should be known to one having ordinary skill in the art that the term "adapter" is interchangeable with the term "coupler" and refers to a device that creates a connection between two fiber optic ferrules, each containing a light carrying medium of fiber. An adapter typically contains a ceramic or phosphorous bronze alignment sleeve and a number of features that provide for latching the connector into the adapter. A MT-RJ adapter, however, does not use an alignment sleeve as the fibers are aligned by precision pins and holes on the mating connector ferrules.

In a non-secured environment, a user of a network is typically provided with a generic patch cable to attach a laptop or desktop to a network. Thus, the generic patch cable can generally interface with any available port in a building. In a typical secured environment, a network designer isolates the networks by providing a different connector configuration to each of the network security levels. For example, a user is given a patch cable commensurate with the user's assigned security level. If the user attempts to insert the given connector on the patch cable into any adapter other than one designed for it, the connector will not fit and a network connection will not be made. A network connection will only be made when a matching connector and adapter are mated. These keyed connectors are typically color coded indicating different security levels.

To secure a network system, the infrastructure in the data center must be connected correctly, tested and then secured such that the network cannot be reconfigured intentionally or by accident. A reversal of security level in a data center can be more damaging than a breach at the workstation outlet. Thus, rather than a single user gaining unauthorized access to a secure channel, a number of unsuspecting users will unknowingly breach security by connecting to an incorrect network.

Moreover, for example, in a private business or military application environment, an analyst being provided "read only" access can inadvertently be connected to a "read and write" network and unknowingly disrupt data and/or sensitive content.

Typically, data center security systems utilize a front side removal of a cassette to facilitate moves, adds and changes (MACS). A common mechanism is to use a plunger grommet design to secure a cassette in a drawer face. Other methods, such as Nordx's (Belden CDT) technology, use a molded quick-release feature on the front side of a cassette for easy access. In a typical cassette assembly of a secured Ethernet network, a keyed solution on a front side of a cabinet is only effective if a rear connector cannot be switched. For example, a switching of a network connection of a fiber ribbon at the connection interface (typically via a MPO connection) is possible in a number of ways. A first and most simple method of switching may occur by opening the rear side door of the cabinet and simply unplugging one connection and plugging in a more secure network in the same port. This weakness can be somewhat obviated by adding a lock to the rear of the cabinet.

A second method for compromising security includes opening the front of the cabinet and sliding the drawer outward to expose the rear of the cassette, thus, allowing for the connections to be changed similar to the first method described herein. Although fixing the drawer in place will prevent certain security breach, without some degree of tray movement, accessibility of front connections is limited and inconvenient for network administrators and/or designated individuals. A third method for breaching security includes accessing the cassette itself from the front of the tray, removing it from plunger grommet features in the drawer face, pulling it toward the user, disconnecting the MPO connector and switching connections as in the first method described herein.

Accordingly, a need exists for a cassette system capable of preventing physical security breach accomplished by switching network cable connections. These and other disadvantages and/or limitations are addressed and/or overcome by the assemblies and methods of the present disclosure.

SUMMARY

The present disclosure describes assemblies and methods for securing a fiber cassette network assembly. In an exemplary embodiment, a secure network cassette assembly is described having: (i) a cabinet with a front and rear side, each of which are adapted to be locked; (ii) a cassette tray adapted to slide back and forth within the cabinet and hold a plurality of cassettes or blanks; (iii) at least one cassette defining a hole adapted to allow for an insert pin to pass through the cassette and engage the cassette tray, wherein the insert pin connects to the cassette tray; and (iv) at least one limiter inside the cabinet adapted to engage the cassette tray to prevent sliding. An exemplary assembly of the present disclosure includes a plurality of cassettes. A typical cabinet associated with the present disclosure is adapted to hold as many cassettes as necessary for a desired network. Blanks are placed in any remaining positions of the cabinet not holding a cassette. Insertion of a blank closes off open areas in the front face of the cabinet that, if left open, would allow physical access to internal components of the assembly.

Similar to the cassettes, blanks define a hole adapted to allow for insert pins to pass through the blank and engage the cassette tray. In an exemplary embodiment, rear access to the cassette from the front side of the cabinet is prevented. The hole on each of the cassettes is typically placed in a position such that if any of the cassettes were forcibly removed from the cabinet, the insert pin associated with the removed cassette will destroy the removed cassette, thereby disabling the network. In certain exemplary embodiments, destroying any of the cassettes will cause an alarm to alert a designated individual, such as a network administrator, that a breach of security has occurred.

Typically, insert pins are attached to a stanchion integrally connected to the cassette tray. However, several locking means exist to hold the insert pins in place including, but not limited to, screws, swivel locks, slide locks, thumb tab locks, swing latches, and combinations therein. A limiter associated with the present disclosure can be a spring pin, a fastener, or combinations thereof. In a typical exemplary embodiment, a cylinder is placed inside each of the holes on each of the cassettes adapted to: (i) allow the insert pin to pass through each of the plurality cassettes and (ii) prevent damage to internal components of the cassette.

An exemplary method of the present disclosure is effective in securing a network cassette assembly by: (i) inserting a plurality of cassettes on a cassette tray in a cabinet having a front side door and a rear side door, wherein each of the front and rear doors is adapted to be locked, and the cassette tray is adapted to slide back and forth within the cabinet; (ii) inserting an insert pin into a hole defined on each of the cassettes, wherein each hole is adapted to allow for the insert pin to pass through the cassette and engage the cassette tray; (iii) sliding the cassette tray into a position that engages at least one limiter inside the cabinet adapted to prevent the cassette tray from sliding; and (iv) locking the front side and the rear side of the cabinet.

Additional features, functions and benefits of the disclosed systems and methods will be apparent from the description which follows, particularly when read in conjunction with the appended figures.

BRIEF DESCRIPTION OF THE DRAWINGS

To assist those of ordinary skill in the art in making and using the disclosed assemblies and methods, reference is made to the appended figures, wherein.

DESCRIPTION OF EXEMPLARY EMBODIMENT(S)

Systems and methods are disclosed that are effective in preventing reversals of keyed solutions from occurring in a data center or telecommunication closets having keyed solutions security as described herein.

Figure 1:
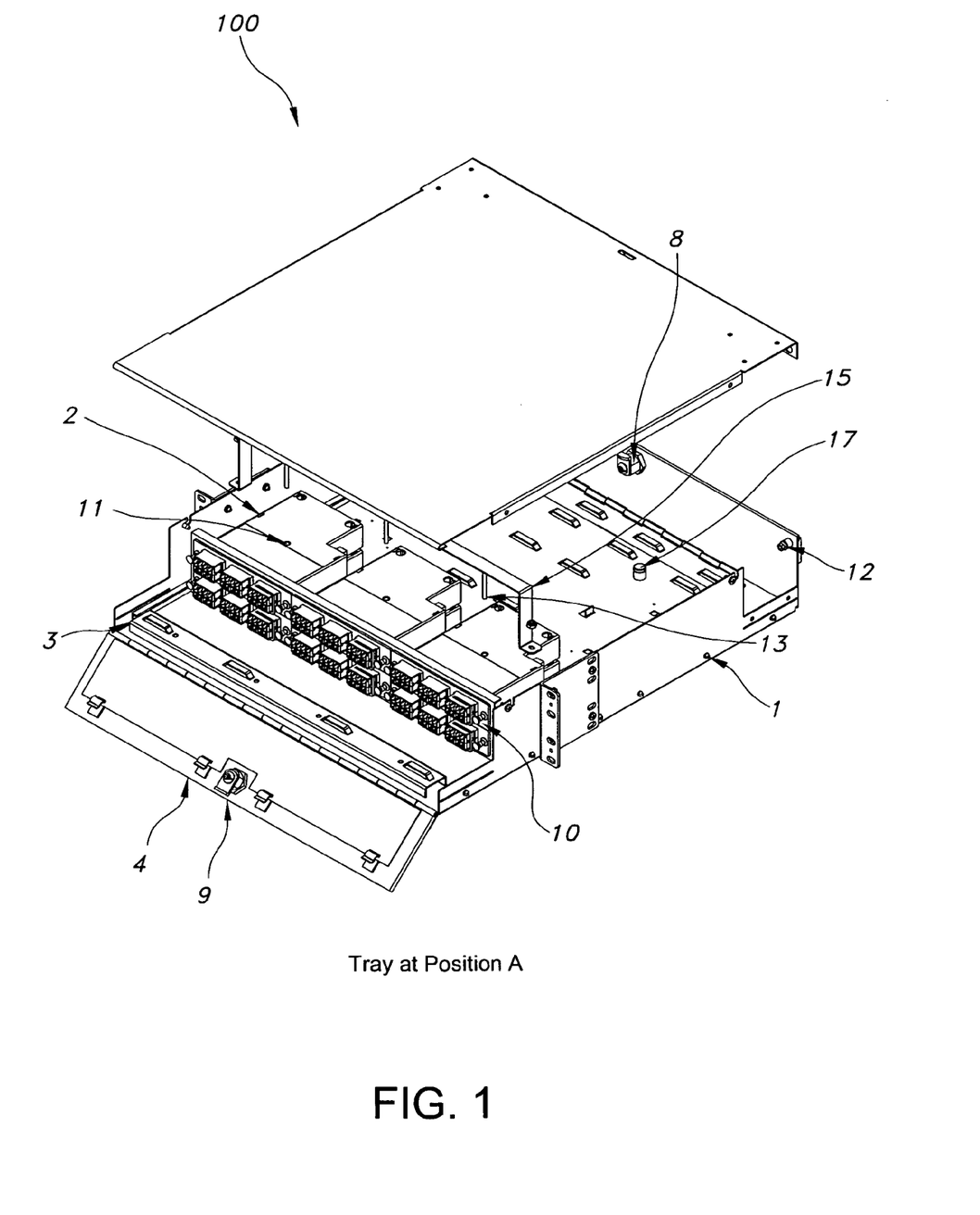
FIG. 1 is a schematic illustrating an exemplary embodiment of a fiber optic network cassette assembly in a position A.

FIG. 1 is a schematic illustrating a typical cassette tray assembly 100 of the present disclosure. In an exemplary embodiment, assembly 100 includes a standard fiber optic enclosure cabinet 1, having additional features, as described below, on at least one cassette 2 and cassette tray 3. Fiber ribbon is typically coiled within each cassette in a substantially circular shape. Assembly 100 further includes front side security door 4 allowing front side cabinet access for patching. Door 4 is adapted to lock, allowing front side access only to selected individuals. In an exemplary embodiment of assembly 100, opening door 4 only allows access to the front side of assembly 100 and access to a rear side 5 is prevented, thus preventing compromise to rear side 5 patch panels. Tray 3 is adapted to host a plurality of cassettes 2, as typical in a network assembly as shown in the exemplary embodiment of FIG. 1. An exemplary embodiment associated with the present disclosure can further include a rear side of a fiber optic breakout cassette, such as the Ortronics, Inc., "Momentum".

An exemplary embodiment associated with the present disclosure obviates the multiple methods of security compromise described above. In an exemplary embodiment, assembly 100, as shown in FIG. 1, includes at least one locking mechanism supported in the body of cassette 2. A locking mechanism is supported on each of the cassettes in an exemplary assembly having a plurality of cassettes 2. An exemplary locking mechanism of the present disclosure defines a through hole 11 adapted to accept an intersecting security pin 13 (insert pin) that engages with cassette tray 3 via vertical stanchion 15. Stanchion 15 is adapted to have a plurality of insert pins 13. Typically, stanchion 15 has as many of pins 13 as are necessary to insert through each hole 11 of each cassette 2. For example, if cassettes are stacked on top of one another such that each cassette's hole 11 is substantially aligned, only one pin 13 is needed for the described pair to pass through both cassettes. Stanchion 15 is integrally connected with tray 3 such that when assembled, cassette(s) 2 are locked in place on tray 3.

Figure 5:
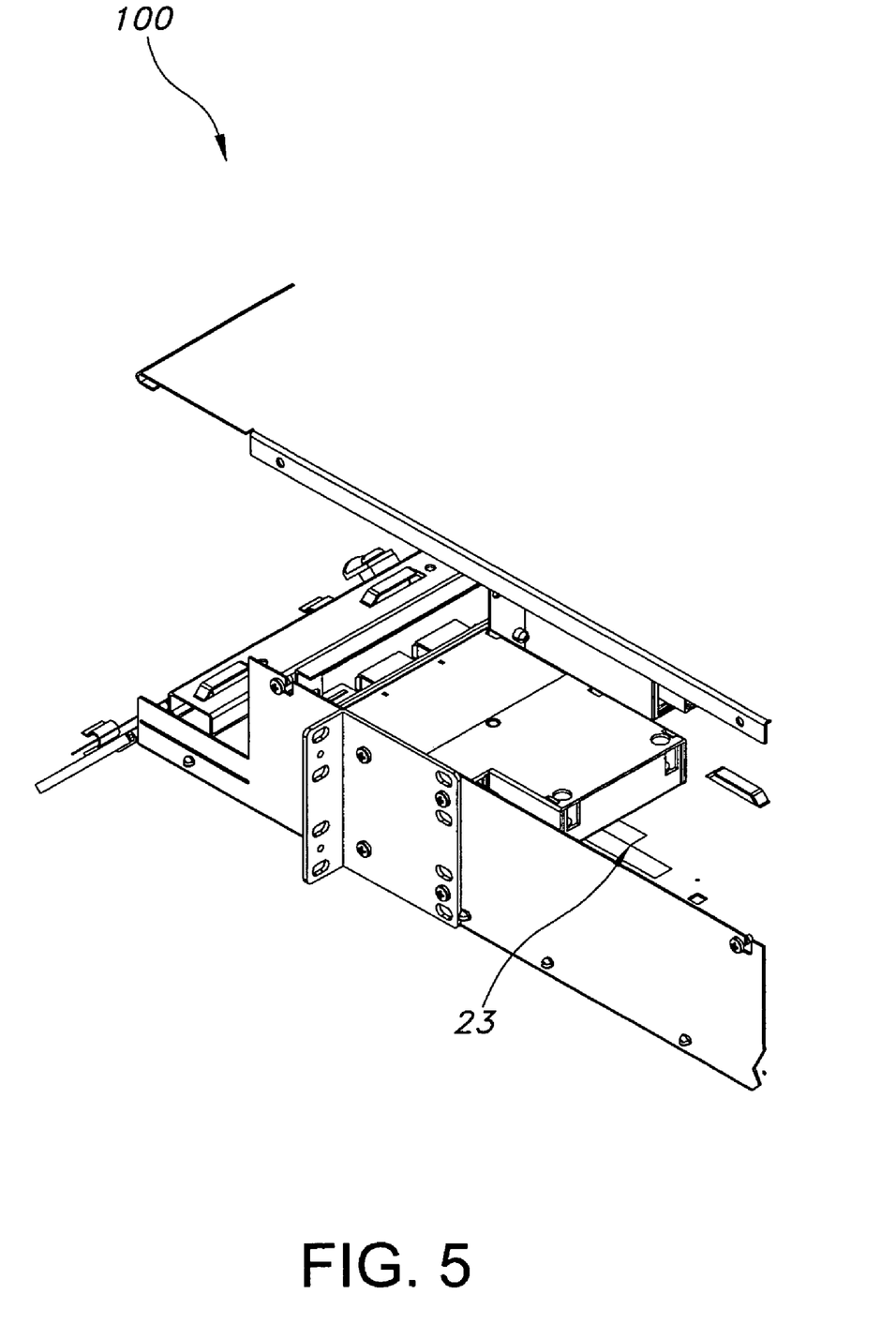
FIG. 5 is a schematic illustrating an exemplary locking mechanism for locking an insert pin to a cassette tray.

FIG. 5 illustrates an exemplary locking mechanism associated with the present disclosure of assembly 100 wherein pins 13 lock in place by engaging a thumb tab 23 of tray 3. Typically, pins 13 define a groove (not shown) adapted to engage tab 23 thereby preventing pin 13 from being removed unless tab 23 is disengaged.

In an exemplary embodiment of the present disclosure, a long hollow cylinder (not shown) is placed in hole 11 and is adapted to protect the fiber within each of cassette(s) 2 during pin 13 insertion. In certain embodiments, the long hollow cylinder is molded in the structure of cassette 2 during fabrication of cassette 2. Hole 11 is typically located in the center of the top side of cassette(s) 2 such that, if the cassette is forcibly removed from assembly 100, the pin will shear the cassette and the internal fibers, thereby disabling the network and the connection. Moreover, assembly 100 can be adapted to alert network administrators, for example, if such a breach occurs, thus making assembly 100 tamper evident.

In an exemplary embodiment, an alarm is triggered alerting the network administrator by the destruction of a cassette. Typically, the triggering is accomplished by the disruption of data transmission. For example, when a cassette is destroyed, data transfer is stopped thus alerting an administrator. Typically, alerts are generated from a software application associated with the data transmission originating from a tampered/destroyed cassette.

As illustrated in FIG. 1, assembly 100 further includes: (i) a lock 8 on rear side door 5 of cabinet 1, thus allowing rear access to system administrators; and (ii) a lock 9 on front side door 4, thus allowing front side access to authorized users. Rear side door 5 access is typically given to administrator(s) who also has access to front side door 4. However, a user authorized to access front side door 4, does not have access to rear side door 5. Lock 8 on rear side door 5 and lock 9 on front side door 4 are discretely keyed, thus a user having access to lock 9 on front side door 4 will not have access to lock 8 on rear side door 5.

In an exemplary embodiment, assembly 100 includes tray limiter 17 adapted to lock tray 3 in place, thus preventing a front access user from moving tray 3. In order to slide tray 3 out of position, for example, a user must disengage tray limiter 17 which can only be accessed through rear side 5. In an exemplary embodiment, assembly 100 is assembled according to the steps described below.

Figure 2:
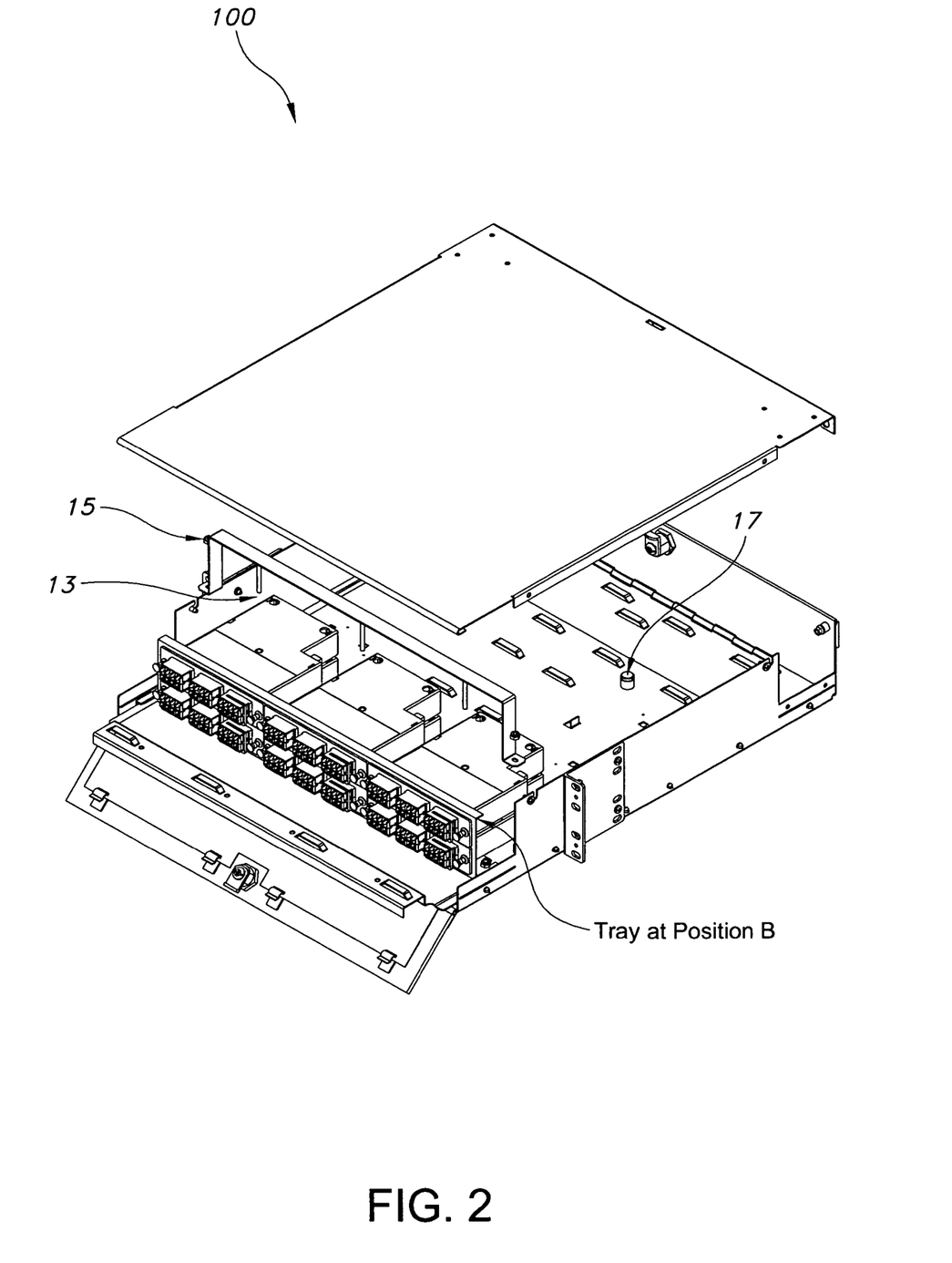
FIG. 2 is a schematic illustrating an exemplary embodiment of a fiber optic network cassette assembly in a position B.
Figure 3:
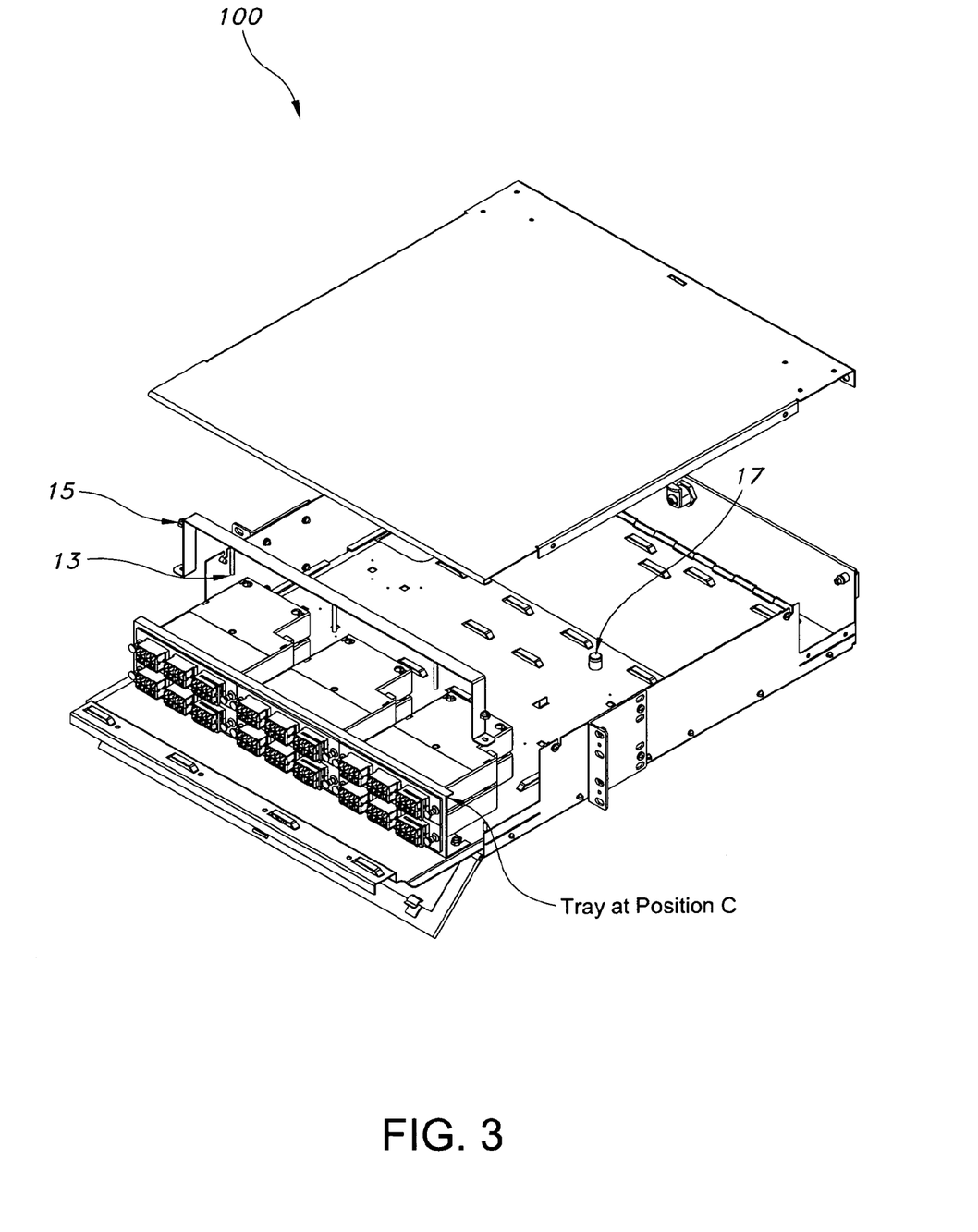
FIG. 3 is a schematic illustrating an exemplary embodiment of a fiber optic network cassette assembly in a position C.

An exemplary method associated with the present disclosure that is effective in securing network cassette assemblies includes a network installer unlocking door 4 and lock 8 on the rear of cabinet 1 and sliding tray 3 forward from position A, as shown in FIG. 1, to position B, as shown in FIG. 2. A network installer is typically the only individual who simultaneously has access to both the front and rear of assembly 100. Position B is an exemplary front patching position providing easy access to a front patch panel, but not exposing the rear cassette area. The installer then disengages limiter 17 as shown in FIG. 2, and slides the tray to position C, as shown in FIG. 3. Limiter 17 can be any limiting means such as, but not limited to, a spring pin or a fastener. The installer can then insert one or more cassettes 2 into assembly 100 on tray 3 through the opening of door 4 on the face of the front of assembly 100.

Figure 4:
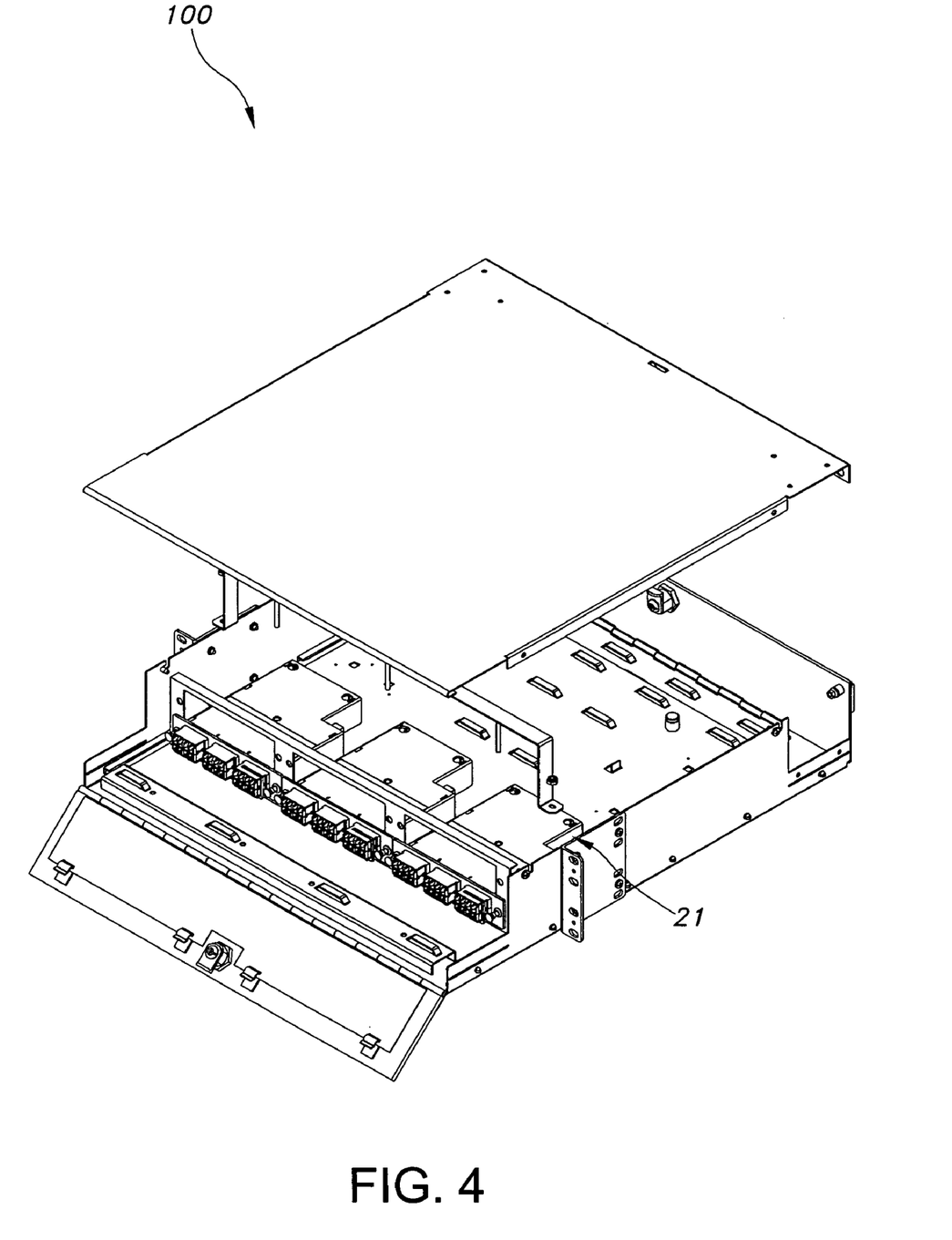
FIG. 4 is a schematic illustrating an exemplary embodiment of a fiber optic network cassette assembly showing blanks filling open slots of a cabinet.

The installer can insert a plurality of cassettes 2 depending upon the requirements of a desired network. To fill open ports in a drawer face, an installer inserts special panel blanks 21, as shown in FIG. 4. Blanks 21 also define holes 11 adapted to accept security pins 13. In an exemplary installation, the installer can then insert security pins 13 through the cassette and/or blanks and lock the pin into a hole of tray 3, thus fixing the cassette(s) and/or blank(s) in place.

The tray is then placed back into position B, reengaging limiter 17, and the interconnect or backbone cabling is attached to corresponding cassettes 2 via a MPO connector on the rear of each of the cassettes 2. The cabling passes through a cable opening 12, adapted to prevent access to the internal components of assembly 100. Opening 12 can be, for example, a collet design providing strain relief adapted to prevent internal component access. Next, the installer verifies the network security level vs. the color code of the adapters for each of the ports on the front of the cabinet. The tray is then placed back into position A. The rear of the cabinet is then locked with lock 8, thus preventing access to limiter 17 and rear cassette channel ports. Although door 4 can also be locked, a front side access only user is prevented from accessing the rear of cassettes 2 without damaging a cassette 2 or assembly 100. Thus, a security breach can be immediately identified and corrected accordingly.

Alternative locking mechanism embodiments include, but are not limited to, inserting individual screws or pins through each cassette 2 and engaging tray 3. Individual screws can be threadedly engaged to tray 3 preventing removal of cassette 2. In an exemplary embodiment, a pin or a screw can be locked into tray 3 with or without a stanchion 15. Locking means typically engage pins 13 and/or screws (not shown) to tray 3 and can be selected from the group consisting of a slide lock, a swivel lock, a swing latch (shown in FIG. 6), a thumb tab (shown in FIG. 5), or a combination therein. All engaging embodiments are adapted to prevent removal of security pins and/or screws unless the locking means are disengaged.

Figure 6:
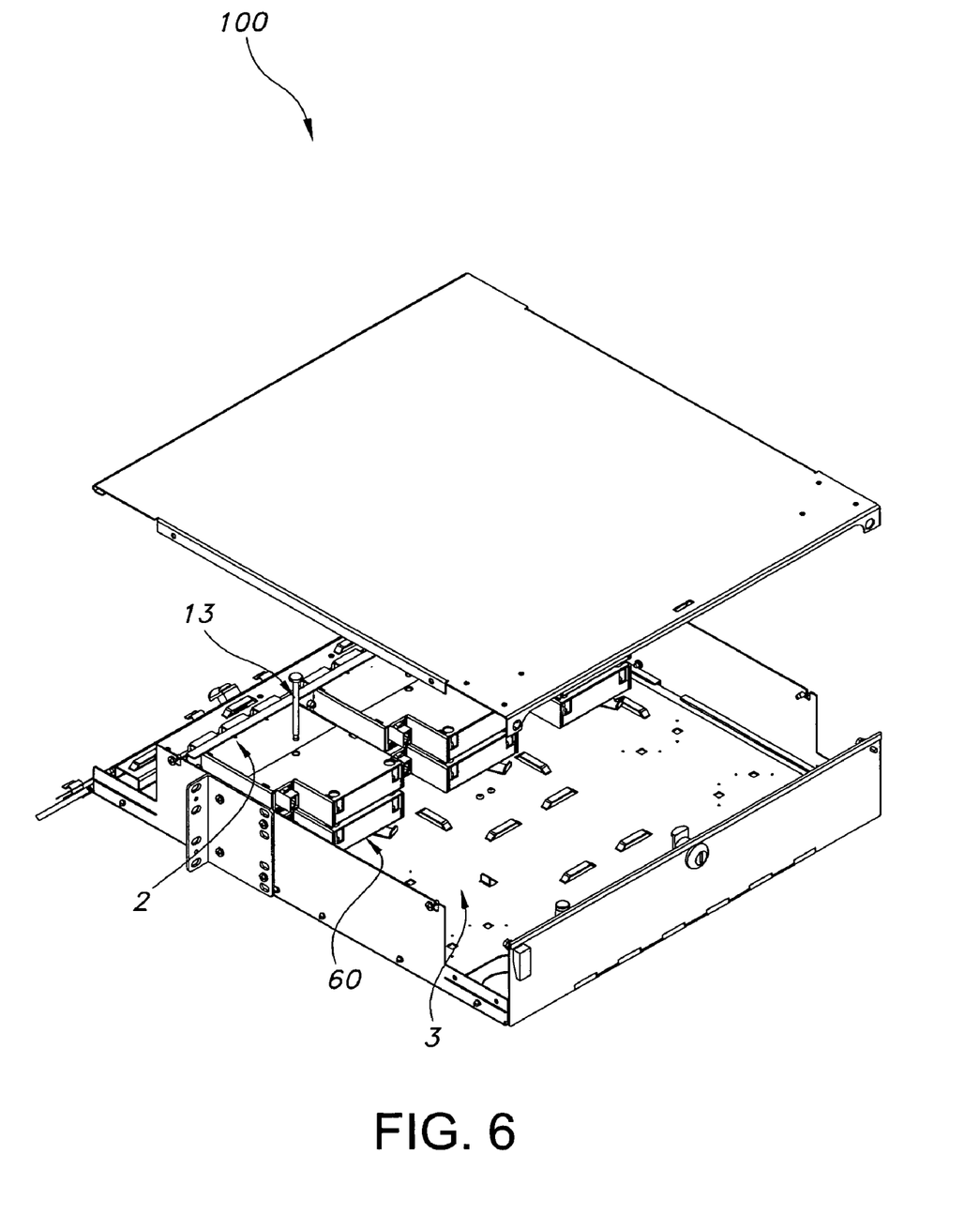
FIG. 6 is a schematic illustrating an exemplary embodiment of a fiber optic network cassette assembly having security pins disengaged from a cassette tray and not attached to a stanchion.
Figure 7:
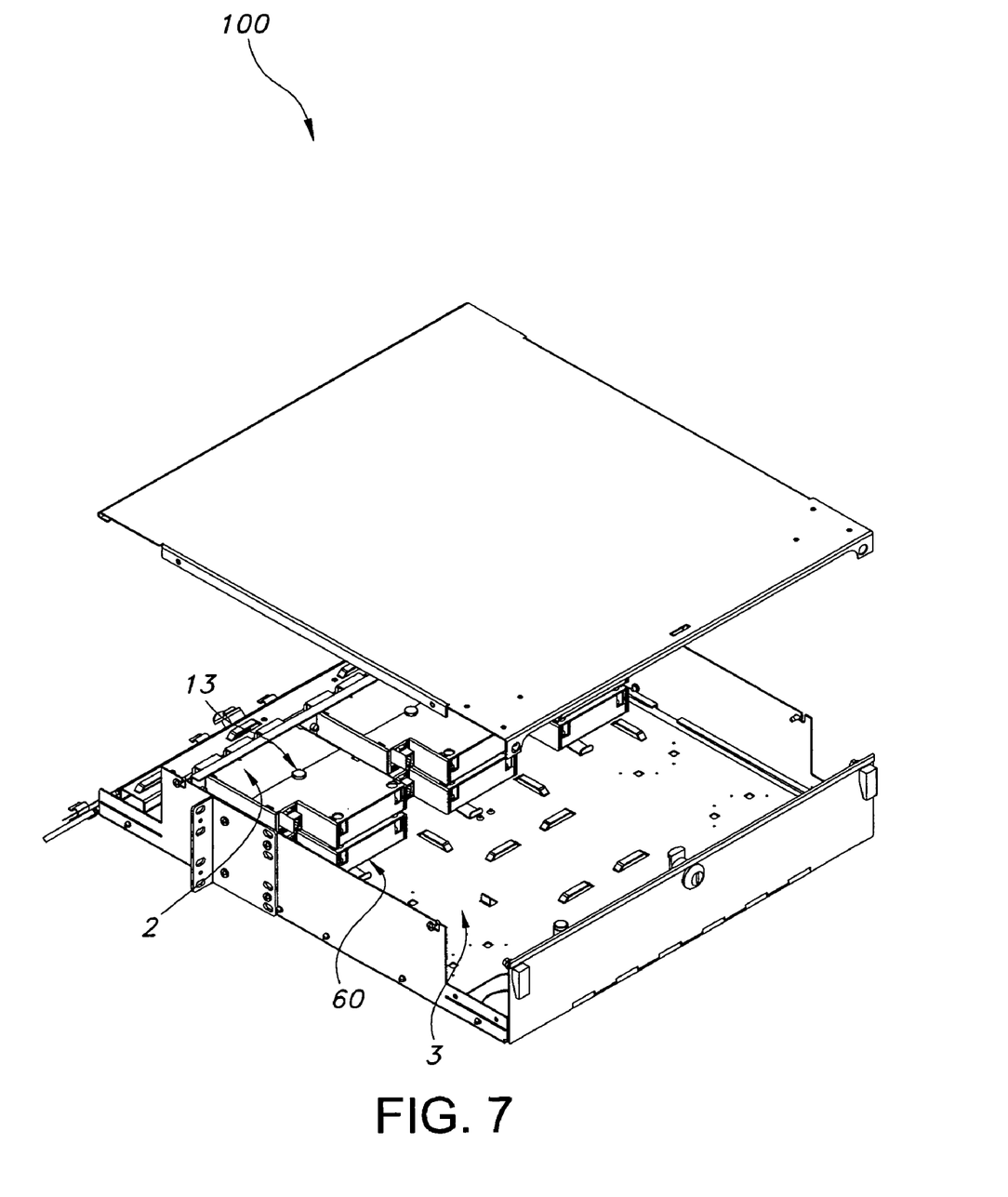
FIG. 7 is a schematic illustrating an exemplary embodiment of a fiber optic network cassette assembly having security pins inserted into the cassettes, engaging the cassette tray and not attached to a stanchion.

FIG. 6 illustrates an exemplary embodiment of assembly 100 wherein security pins 13 are released from tray 3 and disengaged from swing latch 60. Pins 13 in this embodiment are not attached to stanchion 15. When locking cassettes 2 in place, each individual pin 13 is inserted through cassette(s) 2 and engages latch 60. FIG. 7 illustrates an assembly 100 associated with the present disclosure wherein pins 13 are inserted into cassettes 2 and engage latch 60 thereby preventing removal of pins 13 without first disengaging latch 60. Typically, pins 13 define a shoulder groove (not shown) adapted to integrally engage latch 60.

In an exemplary embodiment, component materials for the cassette are made from plastic. It is also within the scope of the present disclosure to use metal (in whole or in part), such as steel or aluminum for the component materials. An exemplary securing pin is made from metal. Typically, the fiber optic cabinet, tray, and stanchions are metal. To prevent forcible extraction of a blank, which in certain embodiments may not disrupt data triggering a software based alarm as described above, blanks can typically be entirely metal. Although reference is made to exemplary materials for forming components and devices of the present disclosure, the disclosed systems and methods are not limited to such referenced exemplary materials.

The present disclosure offers assemblies and methods that advantageously improve network security. A locking mechanism of the present disclosure provides for installing a network cassette assembly into a drawer resulting in a user friendly network for a network administrator, while also providing a substantially tamper evident network. The assemblies and methods described herein allow for moves, adds and changes (MACS) as networks evolve with changing technology. MACS can be facilitated by pin removal steps described above.

Although the present disclosure has been described with reference to exemplary embodiments and implementations thereof, the disclosed assemblies and methods are not limited to such exemplary embodiments/implementations. Rather, as will be readily apparent to persons skilled in the art from the description provided herein, the disclosed assemblies and methods are susceptible to modifications, alterations and enhancements without departing from the spirit or scope of the present disclosure. Accordingly, the present disclosure expressly encompasses such modification, alterations and enhancements within the scope hereof.

What is claimed is:

1. A secure network cassette assembly, comprising:
   (i) a cabinet having a front side and a rear side, wherein each of said front side and rear side is adapted to be locked;
   (ii) a cassette tray adapted to slide back and forth within said cabinet and hold a plurality of cassettes inserted into two or more open slots of a front patch panel disposed at the front side of the cabinet, and at least one panel blank;

(iii) at least one cassette defining a hole adapted to allow for an insert pin to pass through said cassette and engage said cassette tray;
(iv) at least one limiter inside said cabinet adapted to engage said cassette tray, the at least one limiter further adapted to prevent the cassette tray from sliding to a position where a user has rear access to the plurality of cassettes from the front side of the cabinet when the at least one limiter is engaged with the cassette tray;
wherein the at least one panel blank covers one or more open slots in the front patch panel not holding a cassette, to prevent the user from having rear or internal access to the plurality of cassettes from the front side of the cabinet when the at least one limiter is engaged with the cassette tray;
wherein the cabinet is configured and dimensioned to not allow the user to have access to the at least one limiter from the front side of the cabinet when the at least one limiter is engaged with the cassette tray: and
wherein after the user disengages the at least one limiter from the cassette tray, the user may slide the cassette tray to a position where the user has rear access to the plurality of cassettes from the front side of the cabinet.

2. A secure network cassette assembly, comprising:
(i) a cabinet having a front side and a rear side, wherein each of said front side and rear side is adapted to be locked;
(ii) a cassette tray adapted to slide back and forth within said cabinet and hold a plurality of cassettes, inserted into two or more open slots of a front patch panel disposed at the front side of the cabinet, and at least one panel blank;
(iii) a plurality of cassettes, wherein each of said plurality of cassettes defines a hole adapted to allow for an insert pin to pass through said cassette and engage said cassette tray;
(iv) at least one limiter inside said cabinet adapted to engage said cassette tray, the at least one limiter further adapted to prevent the cassette tray from sliding to a position where a user has rear access to the plurality of cassettes from the front side of the cabinet when the at least one limiter is engaged with the cassette tray;
wherein the at least one panel blank covers one or more open slots in the front patch panel not holding a cassette, to prevent the user from having rear or internal access to the plurality of cassettes from the front side of the cabinet when the at least one limiter is engaged with the cassette tray;
wherein the cabinet is configured and dimensioned to not allow the user to have access to the at least one limiter from the front side of the cabinet when the at least one limiter is engaged with the cassette tray: and
wherein after the user disengages the at least one limiter from the cassette tray, the user may slide the cassette tray to a position where the user has rear access to the plurality of cassettes from the front side of the cabinet.

3. An assembly according to claim 2, wherein: (i) said cabinet is adapted to hold as many of said plurality of cassettes as are necessary for a desired network and panel blanks are placed in any remaining open slot positions not holding a cassette; and (ii) each of said panel blanks defines a hole adapted to allow for an insert pin to pass through said panel blank and engage said cassette tray.

4. An assembly according to claim 2, wherein said hole is placed in a position on each of said plurality of cassettes such that if any of said cassettes were forcibly removed from said cabinet, said insert pin associated with said removed cassette will destroy said removed cassette.

5. An assembly according to claim 4, wherein destroying any of said plurality of cassettes will cause an alarm to alert that a breach of security has occurred.

6. An assembly according to claim 2, wherein said insert pins are attached to a stanchion integrally connected to said cassette tray.

7. An assembly according to claim 2, wherein said limiter is selected from the group consisting of a springpin, a fastener, and a combination thereof 8. An assembly according to claim 2, wherein said insert pins define a groove adapted to engage a locking means and are locked to said cassette tray by said locking means.

9. An assembly according to claim 8, wherein said locking means is selected from the group consisting of a screw, a swivel lock, a slide lock, a swing latch, a thumb tab lock and combinations thereof.

10. An assembly according to claim 2, wherein a cylinder is positioned inside each of said holes on each of said plurality of cassettes, said cylinder being adapted to: (i) allow said insert pin to pass through each of said plurality cassettes; and (ii) prevent damage to internal components of said cassette 11. A method of securing a network cassette assembly, comprising the steps of:
(i) providing a cabinet having a front side and a rear side, wherein each of said front side and rear side is adapted to be locked
ii) providing a cassette tray adapted to slide back and forth within said cabinet and hold a plurality of cassettes and at least one panel blank;
(iii) providing a front patch panel comprising a plurality of open slots, and disposed at the front side of the cabinet;
(iv) inserting the plurality of cassettes into two or more open slots of the front patch panel;
(v) placing the at least one panel blank over the remaining one or more open slots in the front patch panel; (vi) inserting an insert pin into a hole defined on each of said plurality of cassettes, wherein each hole is adapted to allow for said insert pin to pass through said cassette and engage said cassette tray;
(vii) sliding said cassette tray into a first position that engages at least one limiter inside said cabinet, wherein: (a) the at least one limiter is adapted to prevent said cassette tray from sliding to a second position where a user has rear access to the plurality of cassettes from the front door of the cabinet when the at least one limiter is engaged with the cassette tray, (b) the cabinet is configured and dimensioned to not allow the user to have access to the at least one limiter from the front door of the cabinet when the at least one limiter is engaged with the cassette tray, (c) the user slides the cassette tray to the second position by first disengaging the at least one limiter from the cassette tray, and (d) the at least one panel blank covering the at least one open slot in the front patch panel prevents the user from having rear or internal access to the plurality of cassettes from the front side of the cabinet when the at least one limiter is engaged with the cassette tray; and
(iv) locking said front and rear doors of said cabinet.

12. A method according to claim 11, wherein: (i) said cabinet is adapted to hold as many of said plurality of cassettes as are necessary for a desired network and panel blanks are placed in any remaining open slot positions not holding a cassette; and (ii) said panel blanks define a hole adapted to allow for said insert pins to pass through said panel blanks and engage said cassette tray.

13. A method according to claim 11, wherein said hole is placed in a position on each of said plurality of cassettes such that if any of said cassettes were forcibly removed from said cabinet, said insert pin associated with said removed cassette will destroy said removed cassette.

14. A method according to claim 13, wherein destroying any of said plurality of cassettes will cause an alarm to alert that a breach of security has occurred.

* * * * *